(12) United States Patent
Biscotti et al.

(10) Patent No.: US 7,318,673 B2
(45) Date of Patent: Jan. 15, 2008

(54) TEMPERATURE CONTROL SYSTEM FOR FOOD ITEMS

(75) Inventors: Michele Biscotti, Castel di Lama (IT); Ernesto Sacchi, Grottammare (IT); Cristiano Paoletti, Ascoli Piceno (IT)

(73) Assignee: S.A.G.I. - S.p.A., Ascoli Piceno (IT)

( * ) Notice: Subject to any disclaimer, the term of this patent is extended or adjusted under 35 U.S.C. 154(b) by 67 days.

(21) Appl. No.: 11/057,376

(22) Filed: Feb. 15, 2005

(65) Prior Publication Data

US 2006/0027567 A1    Feb. 9, 2006

(30) Foreign Application Priority Data

Aug. 6, 2004  (IT)  .................. MO2004A0211

(51) Int. Cl.
*G01K 1/20* (2006.01)
*G01K 3/14* (2006.01)
*G01K 17/08* (2006.01)

(52) U.S. Cl. .................. 374/141; 374/33; 374/110; 374/137; 374/149

(58) Field of Classification Search ................ 374/110, 374/112, 115, 208, 166
See application file for complete search history.

(56) References Cited

U.S. PATENT DOCUMENTS

| | | | | |
|---|---|---|---|---|
| 2,104,711 A | * | 1/1938 | Bratten | .................. 211/153 |
| 3,892,128 A | * | 7/1975 | Smith, Jr. | ................. 73/152.13 |
| 3,955,419 A | * | 5/1976 | Barton et al. | ................ 374/166 |
| 4,747,700 A | * | 5/1988 | Lenz et al. | .................. 374/135 |
| 4,785,665 A | * | 11/1988 | McCulloch | ................... 73/295 |
| 4,870,252 A | * | 9/1989 | Balmer | ...................... 392/446 |
| 6,701,790 B2 | * | 3/2004 | Fortner et al. | ................. 73/703 |
| 6,817,757 B1 | * | 11/2004 | Wallace | ........................ 374/120 |
| 6,976,368 B1 | * | 12/2005 | Lamstaes et al. | .............. 62/130 |
| 2002/0182119 A1 | * | 12/2002 | Daily et al. | .................. 422/119 |
| 2003/0035462 A1 | * | 2/2003 | Savoie | ......................... 374/141 |
| 2003/0219062 A1 | * | 11/2003 | Egidio | .......................... 374/170 |
| 2004/0247015 A1 | * | 12/2004 | Wojan et al. | ................ 374/120 |

* cited by examiner

*Primary Examiner*—Gail Verbitsky
(74) *Attorney, Agent, or Firm*—Nixon & Vanderhye P.C.

(57) ABSTRACT

The invention relates to a control system of the chilling process of the temperature of food items at values near but above 0° C. that prevents surface freezing of a food item. The surface freezing can be foreseen due to a mathematical relationship that is a function of the temperature of the food item immediately below its outside surface and of the air temperature near the outside surface of the food item. The above temperatures are detected by a multipoint needle probe. Positioning inside the food item is determined by a projecting member along the needle.

9 Claims, 2 Drawing Sheets

TEMPERATURE CONTROL SYSTEM FOR FOOD ITEMS

The invention relates to the field of fast lowering of the temperature of food items inside chambers cooled by a refrigerating system. In particular, the present invention relates to a control system of the process that is able to chill the temperature of a food item to values near but greater than 0° C.

Certain chillers are already known that use a needle probe inserted into a food item to measure the core temperature of the product arranged in a chamber cooled by a refrigerating machine, the temperature of the chamber being detected by a chamber probe. Existing chillers control the chilling process by means of an electronic circuit board that receives input values of temperatures as detected by the needle probe and the chamber probe and on the basis of these values regulates the operation of the refrigerating machine. These chillers are divided into two types: a first type comprises chillers that operate in a "static" manner, whereby the refrigerating machine is always run at maximum in order to reach a preset value of the core temperature of the food item or a preset temperature of the chamber temperature; a second type comprises chillers that regulate the process by varying operation of the refrigerating machine in a dynamic manner referring to temperature values of a database with which the electronic circuit board is provided. In both types of the chillers disclosed above, it is not possible to execute the chilling process in an optimal manner because of the different types, quantities and dimensions of the food items arranged in the cooled chamber. Depending on the type, quantity and dimensions of the food item, the optimum value of the core temperature of the product is not always the same. Referring to a single preset value for the core temperature of the product, the refrigerating machine is actuated too early or too late, causing in the first case the surface freezing of the food item or in the second case a longer chilling time of the chilling process.

Surface freezing of the food item is pointless, counterproductive, harmful and wasteful: it is pointless because it does not help the chilling process to become complete; it is counterproductive because it hinders the further penetration of the cold at the food item core; it is harmful because it spoils both the aesthetic appearance and the organoelptic properties of the food item to be chilled; it is wasteful because it causes a further consumption of energy required to complete the chilling process.

In order to overcome these drawbacks, other known chillers provide for the user intervening on the electronic circuit board by manually entering data regarding the type and quantity, i.e. the weight of the food item that is to be chilled. The input data determine the preset value inside the electronic circuit board of the optimal core temperature of the product to be reached during chilling process. The electronic circuit board thus controls the operating modes of the refrigerating machine on the basis of the temperature detected at the core of the product and of the input data entered by the user. By means of such supplementary input data these chillers enable a chilling process to be executed that strongly depends on the characteristics of the particular food item. However, this requires the user to additionally measure or weigh the food item and to manually input the gathered data inside the electronic circuit board before starting the chilling process, which determines additional work for the operator, and a considerable increase in data, that the electronic circuit board has to store and process to set up the respective optimum chilling conditions.

An object of the invention is to improve prior-art systems of control and regulation of the temperature of an environment suitable for housing food products.

A further object is to obtain a method for the control of the temperature of an environment, in particular of a chiller of the temperature of a product that enables surface freezing of the product to be avoided.

A further object is to obtain a method for the control of the reduction of the temperature of an environment that limits intervention by an operator.

In a first aspect of the invention, there is provided a method for regulating the temperature of an environment containing a product, comprising:
  measuring an environment temperature;
  detecting a product temperature;
  comparing said product temperature with a reference temperature;
  varying said environment temperature on the basis of the outcome of said comparing, wherein said detecting comprises acquiring said product temperature internally of said product near an outside surface thereof.

In a second aspect of the invention there is provided an apparatus comprising a detecting arrangement for detecting a product temperature of a product, said detecting arrangement being provided with a plurality of detecting elements for detecting temperatures of distinct zones of said product, wherein the apparatus further comprises a positioning member such as to enable positioning of at least one detecting element of said plurality of detecting elements near an outside surface of said product internally of said product and at least a further detecting element of said plurality of detecting elements near said outside surface externally of said product.

In an embodiment of the apparatus, the detecting arrangement comprises a multipoint needle probe provided with a plurality of temperature detectors suitably distributed on the probe and a suitably positioned cylindrical projection arranged to enable the correct insertion of the probe inside the food item to be chilled.

In a third aspect of the invention the use of a multipoint probe to detect the temperature near a surface of a food item internally of and externally of said food item is provided for.

The invention can be better understood and carried out with reference to the attached drawings that illustrate some exemplifying and non-limitative embodiments thereof, wherein.

Figure 1:
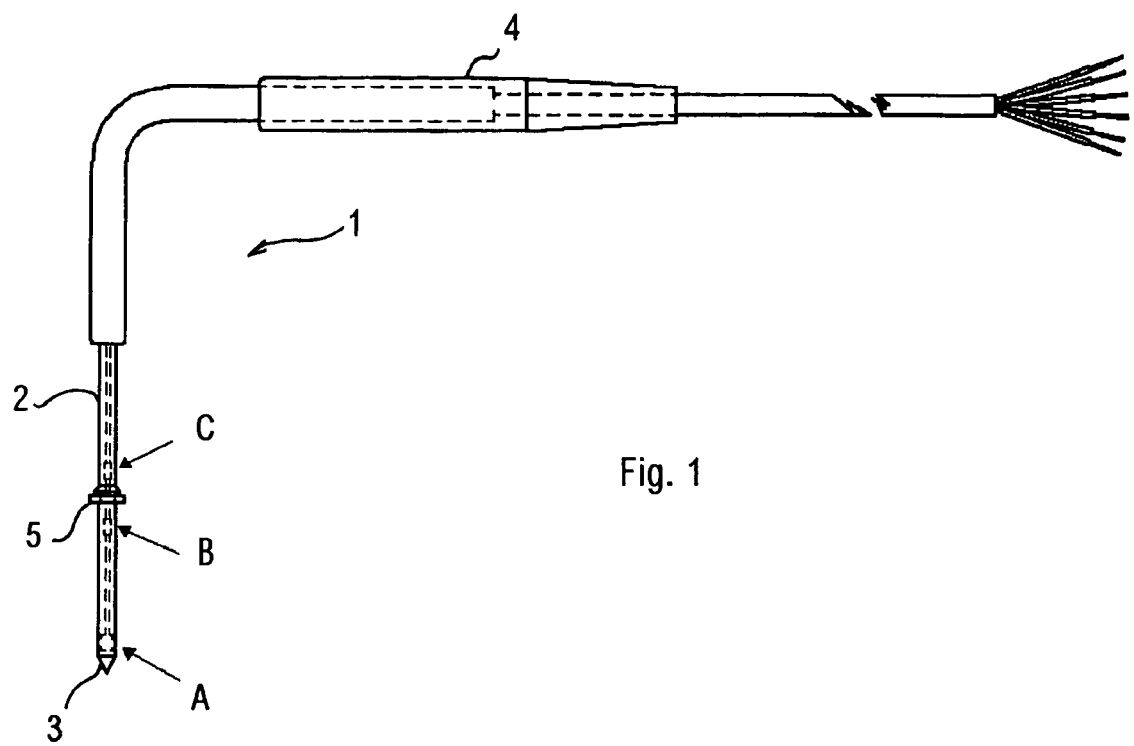
FIG. 1 is a front view of a detecting arrangement for detecting the temperature of a product.

In FIG. 1 there is shown a multipoint needle probe 1 comprised in a control system that controls the temperature of an environment arranged to house a product, in particular a food product. The probe 1 is arranged to be placed in contact with the product to enable its temperature to be detected. The probe 1 comprises a hollow cylindrical body 2, for example made of AISI 316 steel. The outside diameter of the cylindrical body 2 is of 5 mm, the inside diameter is of 4 mm, the total length of the part to be inserted into a food item is of 52 mm. The probe 1 has a tapered tip 3 to facilitate insertion inside the food item and at 202 mm from the tip 3 the probe 1 has an increased section of 10 mm diameter suitably joined to the cylindrical body 2 and provided with a 90° bend. The probe 1 terminates with a handle 4 in plastic material inside which cables connecting the probe 1 with an electronic circuit board, not shown but comprised in the temperature control system, are arranged. The probe 1 has three detecting elements A, B, C, comprising three heat resistances (Pt1000Ω—class B 0° C.) arranged on three levels in the following manner: a first detecting element A is positioned at 7 mm from the tip 3; a second detecting element B is positioned at 40 mm from the first detecting element A; a third C is positioned at 10 mm from the second detecting element B. In the cylindrical body 2 of the probe 1 in an intermediate position between the second detecting element B and the third detecting element C there is provided a projection 5 in AISI 316 steel having a cylindrical shape with an outside diameter of 10 mm and a thickness of 2 mm. The projection 5 enables the correct insertion of the probe 1 in a simple manner that is intuitive and easily controllable by an operator.

Figure 2:
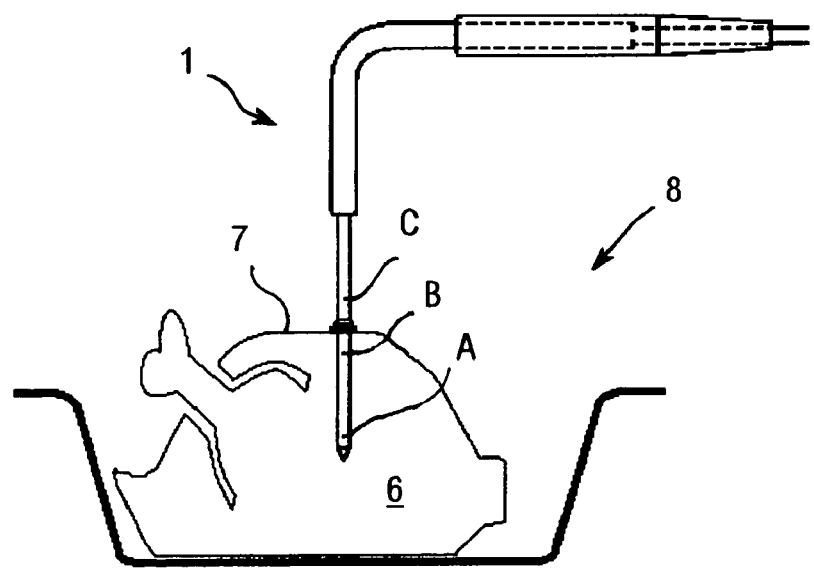
FIG. 2 is a view like the one in FIG. 1 illustrating the detecting arrangement during use.

The correct position of the needle probe 1 inside a food item 6 to be chilled, for example to values near but greater than 0° C., is shown in FIG. 2 and provides for the projection 5 touching a surface 7 of the food item 6, but remaining externally of the food item 6. In this way, the second detecting element B will be positioned internally of the food item 6 to be chilled and very near the surface 7. This position of the detecting element B is suitable for measuring the temperature of the food item 6 immediately below its outside surface 7. This temperature will henceforce be called the "subcutaneous" temperature in this disclosure. In the correct position of the needle probe 1, the third detecting element C is externally of the food item 6 but immediately next to the surface 7 of the food item 6. This position of the third detecting element C is suitable for measuring the temperature of the air near the outside surface 7 of the food item 6. This temperature will henceforce be called the "outside temperature of the outer layer" or simply the "outside" temperature in this disclosure. Lastly, in the correct position of the needle probe 1, the first detecting element A will be completely immersed in the food item 6 that is to be chilled. This position is appropriate for measuring the temperature of the central part of the food item 6. This temperature will henceforce be called the "core temperature" of the food item in this disclosure.

The arrangement of the detecting elements A, B, C, of the multipoint needle probe 1 and the position of the projection 5 enable measuring temperatures in defined zones of the food item to be chilled, that are the core of the food item ("core temperature"), a region immediately below the outside surface of the food item ("subcutaneous temperature") and also a region of the environment near the outside surface of the food item ("outside temperature"). The control system controls the evolution over time of these temperatures and thus enables the chilling process to be optimised so as to prevent surface freezing of the food item.

The control system receives signals corresponding to temperature values that are detected by the multipoint needle probe 1 and by a further probe, that is not shown and that detects the temperature of a thermo-controlled chamber 8, in which the food item 6 is arranged. The temperature conditions of the chamber 8 are determined by an apparatus such as a refrigerating machine, comprising a compressor, an evaporator and a fan spreading air that is cooled by contact with the evaporator. The further probe will henceforth be called a chamber probe. By means of the temperature values detected by the multipoint probe 1 and the chamber probe, the control system manages the entire chilling cycle in the chamber 8 by means of suitable modulation of the operation of the compressor and of the fan.

The control system enables a completely automatic chilling cycle to be obtained and an operator does not have to set any value of the parameters of the chilling process, such as a preset value of the chamber temperature, on the basis of which the operation of the refrigerating machine is controlled. For any type of food item and for any quantity of food item placed inside the cooled chamber the control system does not need to be set by the operator for the type of food item to chill and its weight, as will be better disclosed hereinafter.

The control system furthermore comprises a software program implemented in the electronic circuit board that uses the temperature values detected by the multipoint needle probe 1 disclosed above, processes these values in such a way that optimal development of the chilling process depends not only on the detected value of the core temperature of the product, as occurs in prior-art control systems, but also on the value of the temperature of the food item detected near its surface (subcutaneous temperature) and on the value of the air temperature that touches the outside surface of the food item (outside temperature). In particular, processing the temperature values detected by the needle probe and the chamber probe, the control system sets reference values of the parameters used to control the chilling process. One of these parameters is for example the chamber temperature. The control system then defines a thermostatic chamber temperature, that is a reference value of the chamber temperature to be reached and kept constant inside the chamber by the refrigerating machine. The control system also sets the moment, during chilling process, in which the reference values of the process parameters have to change to new reference values and calculates these new reference values. Operation of the refrigerating machine does not therefore depend exclusively on the outcome of the comparison between the detected core temperature and one or more preset reference values of the core temperature that are in the electronic circuit board, but depends also on the outcome of mathematical relationships implemented in the circuit board. These mathematical relationships are functions of the three temperatures measured in the food item during the chilling process and of the temperature of the chamber measured by the chamber probe.

The control system of the chilling process receives as an input signal both the output signal of the multipoint needle probe 1 and the output signal of the chamber probe that detects the temperature of the chamber 8.

The control system can modify the preset values of the parameters inside the electronic circuit board in order to adapt the chilling process to standard requirments prescribed by different country laws in the field of storage of food items. According to the standard requirments, a reference value used to control the chilling process is the final core temperature, that has to be obtained at the end of the chilling process and/or the maximum time within which the chilling process has to be completed.

By setting the final core temperature or maximum chilling time, the control system determines a value and a temporal sequence of values that the regulating parameters of the chilling process have to reach to complete the process in compliance with the set end-of-cycle values. The process parameters include the chamber temperature and the rotation speed of the evaporator fans.

Figure 3:
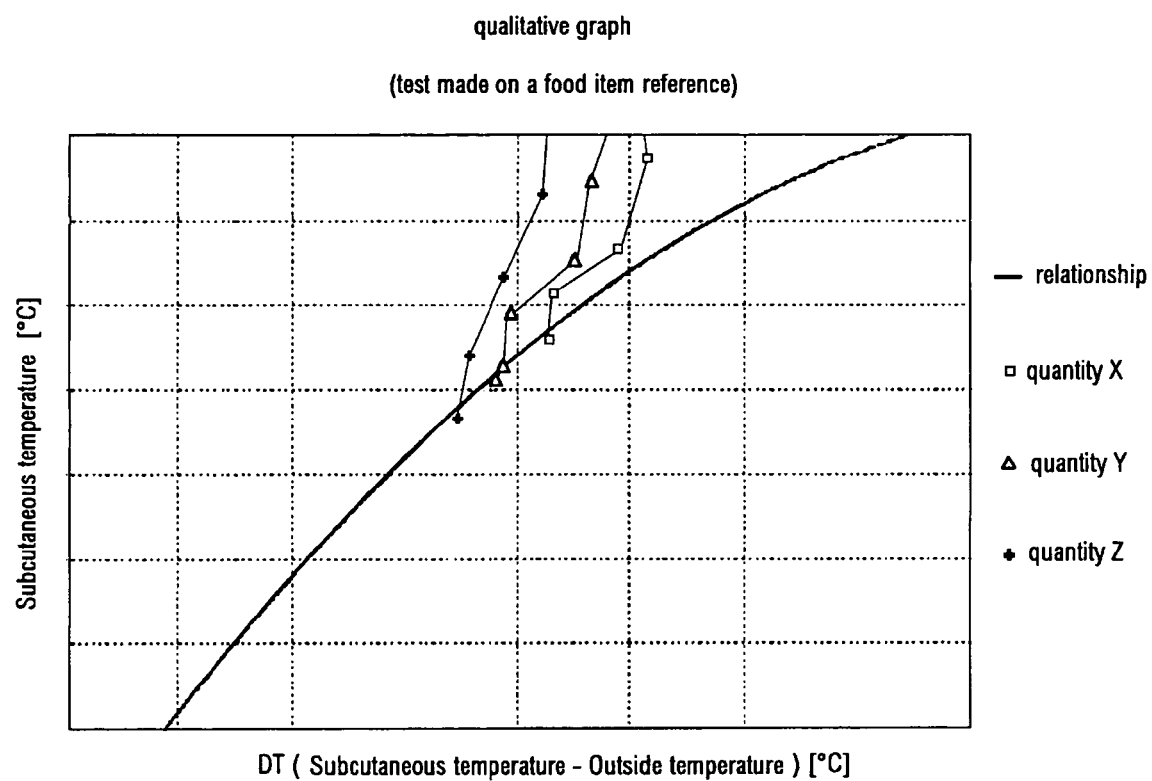
FIG. 3 is a qualitative graph of the product temperature near an outside surface of the product internally of said product versus the difference between the product temperature near said outside surface of the product internally of said product and the product temperature near the outside surface of the product externally of said product.

The invention is based on the surprising effect, deduced from a large number of experiments conducted on a vast range of food items, that the moment when the surface of a food item starts freezing, whatever type the food item may be, whatever its weight and whatever its dimensions, is determined by a mathematical relationship that is in particular a function of the temperature of the food item near its surface ("subcutaneous temperature") and of the temperature of the air that touches the surface of the food item ("outside temperature"). This mathematical relationship is also function of constructional parameters of the needle probe that is used to detect the temperatures. Consequently, the moment in which the surface of a food item would start freezing can be foreseen with extreme precision and the control system suitably varies the reference values of the chilling-process parameters, such as for example the thermostatic temperature of the chamber, the rotation speed of the evaporator fans, etc, in order to preserve the food item from surface freezing. The mathematical relationship that provides surface freezing of the food item and is implemented inside the control system is illustrated in FIG. 3. It is a second degree polynomial function provided with coefficients which depend on the particular constructional type of the needle probe used for detecting the temperature of the food item during the chilling process. These coefficients are preset within the control system and are optimised for the particular multipoint needle probe that is used. These coefficients are in all cases optionally modifiable for the purpose of adapting the operation of the control system to the use of needle probes of the same concept but of a different constructional type from the embodiment disclosed.

The above polynomial function has an expression of this type:

$$T_{subcutaneous} < a*(DT)^2 + b*(DT) + c$$

in which $DT = (T_{subcutaneous} - T_{external})$, i.e. DT is defined by the difference between the measured "subcutaneous" temperature $T_{subcutaneous}$ and the measured "outside" temperature $T_{external}$, and "a", "b" and "c" are the preset coefficients which depend on the constructional type of the multipoint needle probe. In FIG. 3 there are illustrated three cooling curves, which refer to different quantities X, Y and Z of the same food item inserted in the chamber 8. The surface freezing limit of the food item is located on the graph of the above function, regardless of whether quantity X or quantity Y or quantity Z of the food item is inserted in the chamber 8. The same graph also shows the surface freezing limits of food items of different types from the one considered.

The chilling process is controlled as disclosed below. In the initial phase the user just have to insert in the manner disclosed and illustrated in FIG. 2 the needle probe 1 inside the food item 6. The correct position of the probe 1 is assured by the projection 5. No other operation need be performed by the user, i.e. as already said, it is not necessary to set any reference values of process parameters. The control system sets the thermostatic temperature of the chamber at a preset initial reference value, that is anyway optionally modifiable and generally very low, in order to lower the food item temperature in a fast way. Furthermore, the control system initially enables rotation speed of the evaporator fans at the maximum possible. This first phase of rapid decreasing of the temperature terminates at the moment in which the temperature values detected by the needle probe verify the mathematical relationship illustrated in FIG. 3 implemented inside the electronic circuit board and which provides for the limit of surface freezing of the food item.

At this point, the control system completely stops both the compressor and the evaporator fans, preventing in this way surface freezing of the food item. In other words, in this way a second phase of the chilling process, the so-called "stabilisation" phase is enabled, during which the temperature of the food item equalizes between all its parts. This second phase of the chilling process terminates at the moment in which the temperature values detected by the needle probe verify another mathematical relationship, which is also implemented inside the electronic circuit board and is not shown.

At the end of the "stabilisation" phase, the control system enables a third phase of the chilling process. In this phase, the so-called "modulation" phase, the control system sets a new reference value for the thermostatic temperature of the chamber and operates the compressor according to this new reference value, that is higher than that of the first phase. This new value of the thermostatic temperature is determined by the control system on the basis of the software implemented in the electronic circuit board and based on the temperature values detected by the multipoint needle probe. During this third "modulation" phase the rotation speed of the evaporator fans is suitably varied by the electronic circuit board according to the logic of decreasing the speed of the fans as the end of the chilling process approaches.

The chilling process is deemed to be concluded at the moment at which the core temperature of the food item, detected by the needle probe, reaches a preset final value. The final core temperature is implemented in the electronic circuit board and is set according to the standard requirments prescribed by food conservation law in the country in which the refrigerating machine is installed. The final core temperature is anyway optionally modifiable.

The control system regulates the chilling conditions considering detected temperatures of defined product points without requiring the operator to input any product datum.

The control system prevents surface freezing and the melting latent heat of the ice is not removed from the food item to be chilled. By preventing surface freezing of the food item the control system thus enables significant reduction of consumption of electric energy and reducing of the time required to complete the chilling process, at the same time preserving the aesthetic and organoleptic qualities of the food item.

The invention claimed is:

1. Method for regulating the temperature of an environment containing a product, comprising:
   measuring an environment temperature;
   detecting a product temperature;
   comparing said product temperature with a reference temperature; and
   varying said environment temperature on the basis of the outcome of said comparing, wherein:
   said detecting comprises acquiring said product temperature internally of said product near an outside surface thereof,
   before said comparing calculating said reference temperature on the basis of said product temperature is provided,
   said measuring comprises measuring a further environment temperature at a preset distance from said outside surface, said calculating comprises assessing the difference between said product temperature and said further environment temperature, and said varying terminates when said product temperature is equal to or greater than an algebraic function of said difference.

2. Method according to claim 1, wherein said algebraic function comprises a second degree polynomial function of said difference.

3. Method according to claim 1, wherein said varying comprises cooling said environment.

4. Method according to claim 3, wherein said cooling comprises actuating a refrigerating arrangement.

5. Method according to claim 4, wherein after said cooling stopping said refrigerating arrangement is provided.

6. Method according to claim 5, wherein after said stopping keeping said refrigerating arrangement inactive is provided.

7. Method according to claim 6, wherein after said keeping inactive further actuating said refrigerating arrangement is provided.

8. Method according to claim 1, and further comprising acquiring a product core temperature internally of said product at a distance from said outside surface greater than the distance at which said product temperature is acquired near said outside surface.

9. Method for regulating the temperature of an environment containing a product, comprising:

measuring an environment temperature;

detecting a product temperature;

comparing said product temperature with a reference temperature;

varying said environment temperature on the basis of the outcome of said comparing, wherein:

said detecting comprises acquiring said product temperature internally of said product near an outside surface thereof, before said comparing setting said reference temperature is provided, said measuring comprises measuring a further environment temperature at a preset distance from said outside surface, said calculating comprises assessing the difference between said product temperature and said further environment temperature, and said varying terminates when said product temperature is equal to or greater than an algebraic function of said difference.

* * * * *